US012163451B1

(12) United States Patent
Loetz et al.

(10) Patent No.: US 12,163,451 B1
(45) Date of Patent: Dec. 10, 2024

(54) SELECTIVE CATALYTIC REDUCTION FOR HYDROGEN ENGINES

(71) Applicant: Caterpillar Inc., Peoria, IL (US)

(72) Inventors: Andrew Joseph Loetz, West Lafayette, IN (US); Joshua Lynn Ratts, Pine Village, IN (US); Eric Lee Schroeder, Germantown Hills, IL (US); Joel Hiltner, Kinsale (IE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/385,380

(22) Filed: Oct. 30, 2023

(51) Int. Cl.
*F01N 3/02* (2006.01)
*F01N 3/20* (2006.01)

(52) U.S. Cl.
CPC ......... *F01N 3/0205* (2013.01); *F01N 3/2066* (2013.01); *F01N 2410/00* (2013.01); *F01N 2560/026* (2013.01); *F01N 2560/06* (2013.01); *F01N 2900/0411* (2013.01)

(58) Field of Classification Search
CPC .. F01N 3/0205; F01N 3/2066; F01N 2410/00; F01N 2560/026; F01N 2560/06; F01N 2900/0411
See application file for complete search history.

(56) References Cited

U.S. PATENT DOCUMENTS

| 5,441,401 A | 8/1995 | Yamaguro et al. |
| 7,135,153 B2 | 11/2006 | Bartley et al. |

FOREIGN PATENT DOCUMENTS

| CN | 116696528 A | * | 9/2023 |
| DE | 102020209154 | | 1/2022 |
| EP | 3528929 | | 8/2019 |
| IN | 202141002252 | | 7/2022 |
| WO | WO2010017935 | | 2/2010 |
| WO | WO-2022000012 A1 | * | 1/2022 |

* cited by examiner

*Primary Examiner* — Audrey B. Walter
(74) *Attorney, Agent, or Firm* — Lee & Hayes, P.C.

(57) ABSTRACT

A combined heat and power system for generating power using a hydrogen internal combustion engine and producing usable heat from the exhaust gases of the hydrogen internal combustion engine is described. The system includes a heat exchanger and reduction device, such as a catalytic converter. The heat exchanger may extract heat from the exhaust gases upstream of the catalytic converter and thereby control the heat of exhaust gases provided to the catalytic converter for reduction of exhaust gases. The catalytic converter may use hydrogen as a reducing agent, thereby using the same fuel source for powering the engine and reduction of the exhaust gases rather than separate working fluids. The heat exchanger and/or operating parameters of the system may be controlled to control a temperature of exhaust gases at the catalytic converter and thereby control efficiency of the conversion of exhaust gases.

15 Claims, 5 Drawing Sheets

SELECTIVE CATALYTIC REDUCTION FOR HYDROGEN ENGINES

TECHNICAL FIELD

The present disclosure relates to emission reduction systems for hydrogen engines, and more particularly to nitrogen oxide reduction using hydrogen as a reagent for selective catalytic reduction in combined heat and power systems.

BACKGROUND

Various systems and equipment require electricity for one or more functions and also thermal energy for heating space, water, or other components. Combined head and power (CHP) systems, sometimes referred to as cogeneration systems, provide useful electricity and thermal energy to meet such needs more effectively than conventional separated systems because thermal energy rejected during the on-site production of electricity can be recovered to meet thermal load requirements.

In an effort to reduce ambient levels of air pollution, various systems have existed for reducing the emissions of nitrogen oxides (NOx) and particulate matter (PM). Existing aftertreatment technologies for achieving these goals include both PM reduction systems and NOx reduction systems. For PM reduction, existing technologies may include a continuously regenerating trap (CRT®) and catalyzed traps. The term "CRT®" refers specifically to the particulate filter manufactured by Johnson Matthey of London, United Kingdom, described in U.S. Pat. No. 4,902,487. For NOx reduction, existing technologies include selective catalytic reduction (SCR) systems that use urea as the reductant, and NOx storage catalysts.

SCR systems typically use urea as a reagent for NOx which requires handling an additional consumable fluid on-site with the fuel source for the CHP system. Further, CHP systems use heat exchange systems to recover exhaust heat energy and thereby reduce exhaust temperatures to a level of around between 120° C. to 150° C. These reduced temperatures mean that the SCR system must typically be positioned upstream of the heat exchanger systems for efficient conversion of NOx when using urea, which is more efficient at temperatures above 200° C.

Despite their effectiveness, urea SCR systems are not without their shortcomings. Urea-based SCR is based on ammonia reduction, with urea being the primary reductant of choice. Ammonia is considered to be highly toxic, whereas urea is only mildly toxic. However, urea-based SCR still requires that a separate supply of urea be kept on-board. Not only does this requirement call for a separate storage tank, but the urea must be replenished periodically and there is no infrastructure to provide a nationwide supply. Also, the system required to introduce urea into the exhaust stream is complex. In sum, there are many issues affecting the practicality of using urea for SCR in CHP applications.

An example of a hydrogen internal combustion engine and method for operating an exhaust system thereof is described with respect to German Patent Application DE102020209154 (the "'154 patent"). The '154 patent describes a hydrogen internal combustion engine with an exhaust system that uses SCR to reduce NOx emissions. To reduce the NOx emissions, the '154 patent describes heating the catalytic converter with a heating element to bring the catalytic converter to an operating temperature for efficiency of NOx conversion. The '154 patent describes using hydrogen gas for SCR such that injected hydrogen gas is converted into water and nitrogen when combined with NOx in the exhaust gas. The operating temperature of the catalytic converter is controlled using an electrical heating device to raise the heat within the catalytic converter to a predetermined operating temperature of around 100° C. The '154 patent therefor provides for raising a temperature of the catalytic converter for SCR to an operating temperature using electrical power.

Examples of the present disclosure are directed toward overcoming the deficiencies described above.

SUMMARY

One general aspect includes a system including: a hydrogen supply; a hydrogen internal combustion engine that receives hydrogen from the hydrogen supply and generates power; a first exhaust conduit coupled to the hydrogen internal combustion engine for transporting first exhaust gases away from the hydrogen internal combustion engine; a heat exchanger coupled to the first exhaust conduit configured to receive the first exhaust gases from the hydrogen internal combustion engine and output second exhaust gases and heated fluid; a second exhaust conduit coupled to an outlet of the heat exchanger for transporting the second exhaust gases; and a catalytic converter coupled to the second exhaust conduit downstream of the heat exchanger, the catalytic converter configured to receive hydrogen from the hydrogen supply and perform selective catalytic reduction on the second exhaust gases using the hydrogen.

In some aspects, the system, further includes a bypass conduit coupling the first exhaust conduit to the second exhaust conduit in parallel with the heat exchanger, the bypass conduit configured to deliver third exhaust gases from the first exhaust conduit to the second exhaust conduit, the bypass conduit including a bypass valve for selectably controlling a ratio of the second exhaust gases and the third exhaust gases. In some aspects, the system further includes a first sensor positioned before an entrance to the catalytic converter configured to measure a first concentration of nitrogen oxide; and a second sensor positioned downstream of an exit from the catalytic converter configured to measure a second concentration of nitrogen oxide, and wherein the bypass valve is selectably controllable by a computing device based at least in part on at least one of the first concentration of nitrogen oxide and the second concentration. In some aspects, the system further includes a temperature sensor positioned before an inlet to the catalytic converter, and wherein the bypass valve is controllable by a computing device based at least in part on temperature data from the temperature sensor. In some aspects, the system further includes a computing device configured to determine operating parameters of the hydrogen internal combustion engine and control the bypass valve based at least in part on the operating parameters. In some aspects, the system further includes a coolant pump configured to control a flow of the heated fluid through the heat exchanger; a first sensor positioned before an entrance to the catalytic converter configured to measure a first concentration of nitrogen oxide; and a second sensor positioned downstream of an exit from the catalytic converter configured to measure a second concentration of nitrogen oxide, and wherein the coolant pump is controllable by a computing device based at least in part on at least one of the first concentration of nitrogen oxide and the second concentration. In some aspects, the system further includes a temperature sensor positioned before an inlet to the catalytic converter, and wherein a coolant pump of the heat exchanger is controllable by a computing device based at least in part on temperature data from the temperature sensor. In some aspects, the system further includes a computing device configured to determine operating parameters of the hydrogen internal combustion engine and control a coolant pump of the heat exchanger based at least in part on the operating parameters.

In some aspects, the techniques described herein relate to an exhaust system for a hydrogen engine including: a first exhaust conduit coupled to the hydrogen engine for transporting first exhaust gases away from the hydrogen engine; a heat exchanger coupled to the first exhaust conduit configured to receive at least a portion of the first exhaust gases from the hydrogen engine and output second exhaust gases and heated fluid; a second exhaust conduit coupled to an outlet of the heat exchanger for transporting the second exhaust gases; and a catalytic converter coupled to the second exhaust conduit downstream of the heat exchanger, the catalytic converter configured to receive hydrogen from a hydrogen supply of the hydrogen engine and perform selective catalytic reduction on the second exhaust gases using the hydrogen.

In some aspects, the techniques described herein relate to a combined heat and power system including: a first hydrogen supply line; a hydrogen internal combustion engine that receives hydrogen from the first hydrogen supply line and produces power; a first exhaust conduit extending from the hydrogen internal combustion engine; a heat exchanger coupled with the first exhaust conduit that transfers heat from exhaust gases emitted by the hydrogen internal combustion engine; a coolant pump that controls a flow of coolant through the heat exchanger; a second exhaust conduit extending from the heat exchanger; a bypass valve fluidly coupling the first exhaust conduit to the second exhaust conduit in parallel with the heat exchanger; a second hydrogen supply line; and a catalytic converter coupled to the second exhaust conduit downstream of the heat exchanger, the catalytic converter configured to receive hydrogen from the second hydrogen supply line and perform selective catalytic reduction on exhaust gases using the hydrogen.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts.

Figure 1:
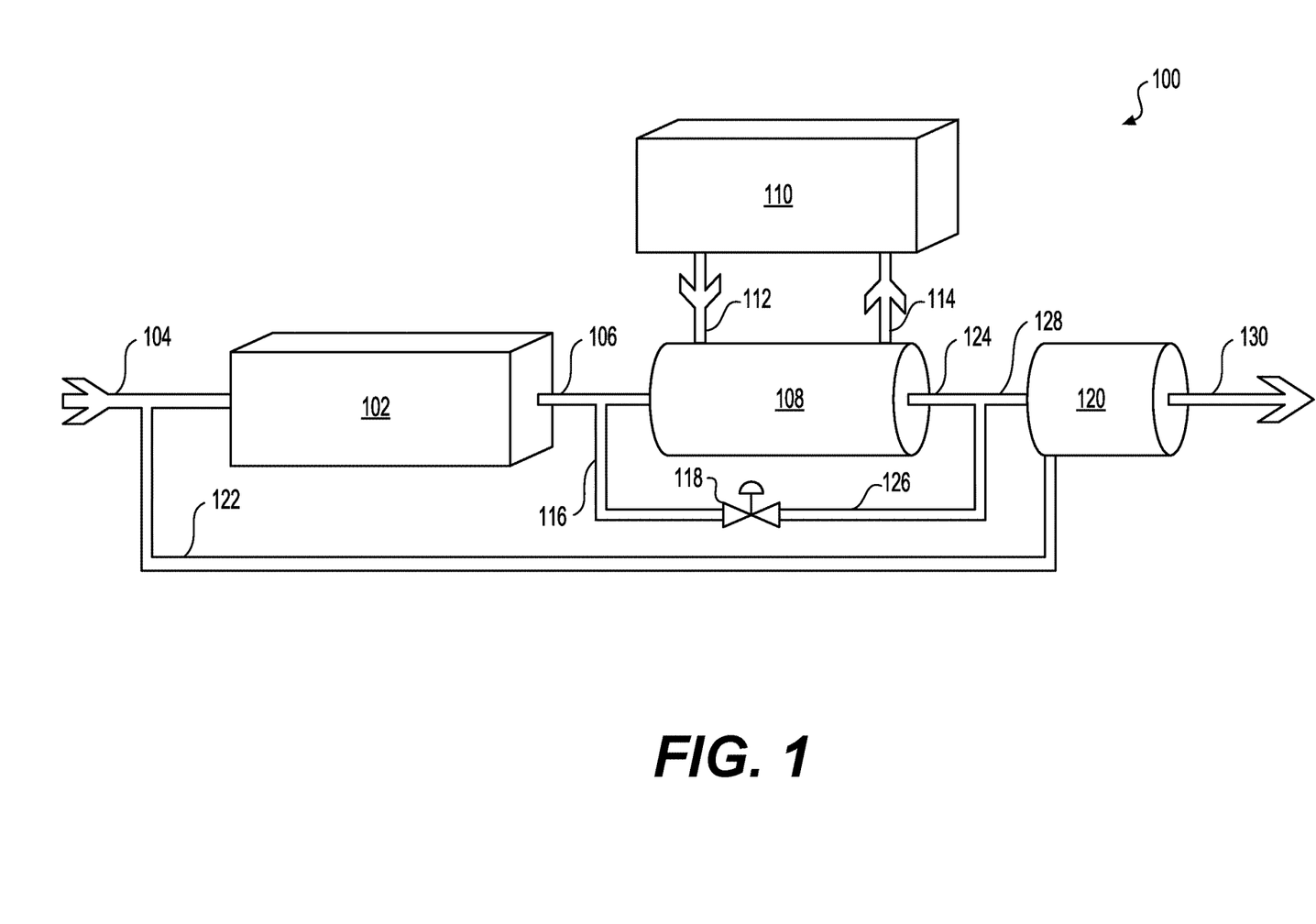
FIG. 1 illustrates a combined heat and power system including a hydrogen engine and heat exchanger, according to at least one example.

FIG. 1 illustrates a combined heat and power system 100 including a hydrogen engine 102 and heat exchanger 108, according to at least one example. The combined heat and power system 100 further includes a heat exchanger 110 to heat using the heat exchanger 108. The heat exchanger 108 is positioned downstream of the hydrogen engine 102 along the exhaust line. The combined heat and power system 100 further includes a selective catalytic reduction component (e.g., catalytic converter 120) positioned downstream of the heat exchanger 108.

The hydrogen engine 102 is supplied by a hydrogen supply 104 for combustion that may be used to generate power for a system through the hydrogen engine 102. The present description relates to an exhaust system for a hydrogen internal combustion engine and a method for operating an exhaust system of the hydrogen engine 102, in particular an exhaust system for a hydrogen engine 102 with devices for heat exchange and selective catalytic reduction.

The hydrogen engine 102 may be used for power generation as emission regulations become more stringent, particularly with regard to carbon oxide emissions. In the case of a hydrogen internal combustion engine, due to the high temperatures and the nitrogen present in the air, nitrogen oxides can also occur in the exhaust gas, which can be post-treated with the aid of a catalytic converter device, such as a catalytic converter device based on the principle of selective catalytic reduction, in combination with hydrogen gas to reduce nitrogen oxide emissions as much as possible.

As shown and described with respect to FIG. 5 below, a catalytic converter device, such as a catalytic converter device based on the principle of selective catalytic reduction, is most efficient at particular temperature ranges. The invention described herein is directed to an SCR system that does not require urea as the reductant. The system uses hydrogen instead of urea, which eliminates the requirement for a second supply tank and the need for a second fluid supply infrastructure.

The combined heat and power system 100 uses the hydrogen supply 104 to provide fuel to the hydrogen engine for combustion and exhaust channel 106 for exhaust out of the hydrogen engine 102. The combined heat and power system 100 then includes a heat exchanger 108 downstream of the hydrogen engine 102 and connected to the exhaust channel 106. The heat exchanger 108 is connected through a first conduit 112 and a second conduit 114 to a heat exchanger 110 for heating using the heat extracted from the exhaust channel 106. The first conduit 112 and the second conduit 114 provide for coolant to travel between the heat exchanger 108 and the heat exchanger 110. Accordingly, the combined heat and power system 100 provides for power output using the hydrogen engine 102 as well as heating using the waste energy from the exhaust of the hydrogen engine 102.

The combined heat and power system 100 also includes a catalytic converter 120 downstream of the heat exchanger 108. The hydrogen gas is combusted with air in at least one combustion chamber of the hydrogen engine 102. The exhaust system has a catalytic converter 120 arranged down- stream of the hydrogen engine 102 and the heat exchanger 108 and is designed to at least partially post-treat the exhaust gas flowing out of the hydrogen engine. The catalytic converter 120 may be a Selective Catalytic Reduction (SCR) catalytic converter device, which is based on the principle of selective catalytic reduction with hydrogen gas. Here, the injected hydrogen gas is converted into water and nitrogen with the nitrogen oxides contained within the exhaust gas.

To accomplish the catalytic reduction, the combined heat and power system includes a hydrogen bypass conduit 122 from the hydrogen supply 104 to the catalytic converter 120 for the SCR reaction using hydrogen. In a conventional system, SCR may use urea as a reagent for nitrogen oxide. However, the use of urea as a reagent requires handling of an additional consumable fluid on site in addition to the fuel source for the hydrogen engine 102. Accordingly, the use of hydrogen as the reagent for SCR of nitrogen oxides in the exhaust reduces the need to store and handle an additional fluid on site and therefore simplifies the use and installation of the combined heat and power system 100.

In typical combined heat and power systems, the SCR process requires high exhaust temperatures for efficient conversion of nitrogen oxides when using urea. This results in placing the catalytic converter upstream in the exhaust system of the heat exchanger. However, in the presently described combine heat and power system, the use of hydrogen as a reagent provides for the catalytic converter 120 to perform efficient conversion of the nitrogen oxides at relatively low temperatures, as compared with the exhaust temperature at the exhaust channel 106 (e.g., in a range of 120 to 150 degrees Celsius). In this manner, the position of the catalytic converter 120 downstream of the heat exchanger 108 provides for controlling the temperature of the exhaust gases at the catalytic converter for conversion of the nitrogen oxides.

The products of the catalytic converter, based on the inputs of hydrogen gas and nitrogen oxides (e.g., from the exhaust gases) include nitrogen in the form of N2. The exhaust gases also include NO2 that may be reduced in the catalytic converter 120 to produce N2 as well. As described with respect to Equation (1) and Equation (2) below, the NOx gases may be reduced to N2 gases using hydrogen as a reactant. For example, the NOx and hydrogen gases that flow into the catalytic converter result in N2 and H2O products. In this manner, the main components of the exhaust gases downstream of the catalytic converter 120 include nitrogen gas and water.

The exhaust gases and hydrogen may be fed and/or metered into the catalytic converter 120 based on a proportion of NOx in the exhaust. A 1:1 molar ratio of H2:NO is expected for efficient conversion of NO to N2 in accordance with Equation (1) below. However, NO2 exists in the exhaust simultaneously with NO, either from the combustion process. A 2:1 ratio of H2:NO2 is expected for efficient conversion of NO2 to N2 in accordance with Equation (2) below. In some examples or applications, hydrogen oxidation may occur at temperatures above one hundred degrees Celsius, and therefore additional hydrogen may be needed (to be provided to the system) relative to the NOx in order to obtain high levels of conversion of NOx. In some examples, hydrogen may be provided in amounts up to or in excess of one hundred times the portion of NOx to achieve the NOx conversion due to hydrogen oxidation directly to water.

$$2NO + 2H_2 \rightarrow N_2 + 2H_2O \quad \text{Equation} \quad (1)$$

$$2NO_2 + 4H_2 \rightarrow N_2 + 4H_2O \quad \text{Equation} \quad (2)$$

The heat exchanger 108 and the heat exchanger 110 may be used to transfer heat from the exhaust channel 106 to a second location, such as for heating one or more facilities, environments, or equipment. The heat exchanger 108 couples to the exhaust channel 106 to receive exhaust fluid from the hydrogen engine 102 and functions to transfer heat from the hot exhaust fluid received from exhaust channel 106 to coolant that can travel through second conduit 114 to heat exchanger 110 for heating the second location. The coolant may return to the heat exchanger 108 through the first conduit 112 for receiving heat energy from the exhaust fluid at the heat exchanger 108.

At the exit of the heat exchanger 108, a conduit 124 carries the exhaust gases exiting the heat exchanger 108 to join exhaust gases passing through bypass valve 118 and conduit 126 to a combined conduit 128 that enters the catalytic converter 120. After exiting the catalytic converter 120, the exhaust gases (after reduction) leaves through conduit 130 and may pass to one or more additional treatment and/or emission systems.

In some examples, the exhaust system may include a bypass 116 that branches from the exhaust channel 106 to enable flow of a portion (or in some cases all) of the exhaust fluid without passing through the heat exchanger 108.

According to some examples, a method of operating an exhaust train of a hydrogen engine 102 configured to be fueled with hydrogen gas is described herein. The hydrogen gas is combusted with air in at least one combustion chamber. The exhaust system has a catalytic converter 120 and a heat exchanger 108, which are both arranged downstream of the at least one combustion chamber of the hydrogen engine 102 with the heat exchanger positioned upstream of the catalytic converter 120 and the heat exchanger 108 and catalytic converter 120 are designed to at least partially after-treat the exhaust gas flowing out of the at least one combustion chamber. The method includes operating the heat exchanger 108 to transfer heat from the exhaust gases for one or more purposes as well as to reduce a temperature of the exhaust gases such that hydrogen may be used for reduction within the catalytic converter 120. The heat exchanger 108 may be connected with a coolant pump (e.g., coolant pump 204 of FIG. 2) that is used to transfer a working fluid and thereby transport heat from the heat exchanger (and thus the exhaust gases) to a destination for heating. In some examples, the exhaust system further includes a bypass valve and bypass conduit that enables or allows a portion and/or all of the exhaust gases to bypass the heat exchanger and pass directly to the catalytic converter. The bypass valve may be controllable to enable control of a ratio of exhaust gases passing through the heat exchanger to exhaust gases bypassing the heat exchanger. In this manner, the method and system may provide for enabling control of temperature at the catalytic converter based on the mix of gases passing through the bypass valve and/or the heat exchanger.

Preferably, the predetermined operating temperature of the catalytic device is approximately 100° C. In some examples the catalytic converter may operate in a range of about 100° C. to about 150° C. or in a range of about 120° C. to about 150° C.

In some examples, the exhaust system also has a hydrogen gas injection device arranged downstream of the at least one combustion chamber and at or upstream of the catalytic converter, which is designed to inject hydrogen gas as a reducing agent into the exhaust system. The method according to the invention further includes injecting a predetermined amount of hydrogen gas into the exhaust line by means of the hydrogen gas injection device when the catalytic converter. In some examples, the hydrogen gas injected may be controllable based on sensor data gathered from the exhaust system, for example to include (in a non-limiting example) nitrogen oxide gas concentration in the exhaust system. Accordingly, an appropriate amount of hydrogen gas may be injected to reduce the nitrogen oxide gases.

In some examples, the system may further determine transient operating conditions of the hydrogen engine 102 such as determining whether the hydrogen engine 102 is about to start or increase rate or power production and to control the bypass valve 118, heat exchanger 108 (e.g., coolant pump), and/or hydrogen injection into the catalytic converter 120 based on the expected or actual transient operating conditions. For instance, the hydrogen engine 102 may ramp up for meeting a peak power demand, and therefore produce a greater quantity or in some cases hotter exhaust gases. The coolant pump of the heat exchanger 108 may ramp up to transfer heat from the larger volume and/or hotter exhaust gases such that the heat exchanger is prepared and already operating at the levels needed when the additional exhaust gases arrive rather than waiting for the exhaust system to heat up excessively and then respond.

In some examples, a heating device may be provided upstream of catalytic converter 120 and downstream of the at least one combustion chamber and is designed to heat the gases and/or catalytic converter 120 to a predetermined operating temperature, for example approximately one hundred degrees Celsius. The heating device may include an electrically operated heating device which forms what is known as an electrically heated catalyst (EHC) with the catalytic converter 120. The heating device can have a heating disc, for example, through which the exhaust gas can flow to absorb the heat generated electrically by the heating disc. In particular, the exhaust gas flows through the electrically operated heating disk and can absorb the electrically generated heat and flow through the catalytic converter 120.

The hydrogen injection through conduit 122 may include a hydrogen gas injection device arranged upstream of catalytic converter 120 and downstream of the at least one combustion chamber, which is designed to inject hydrogen gas as a reducing agent into exhaust gas line and/or directly into the catalytic converter 120. Alternatively, the hydrogen gas may enter the exhaust line from those hydrogen gas injectors that inject the hydrogen gas into the at least one combustion chamber of the hydrogen engine 102. In particular, the hydrogen gas of these hydrogen gas injection devices can be injected into the at least one combustion chamber during a working phase and/or ejection phase, which then reaches the exhaust gas line unburned. In such an alternative configuration, the hydrogen gas injector may be omitted and the hydrogen gas within the exhaust line may be used for reduction at the catalytic converter.

Figure 2:
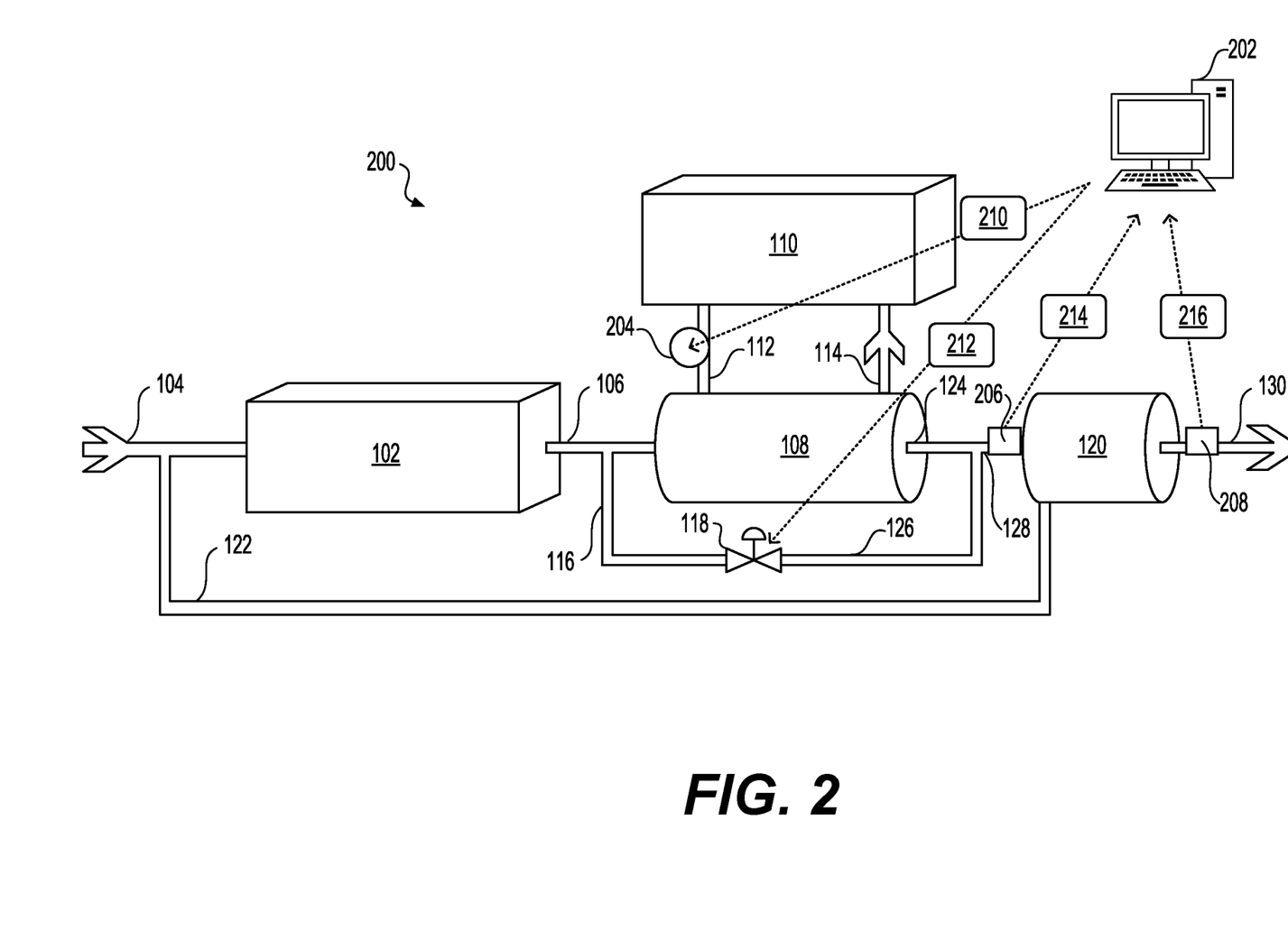
FIG. 2 illustrates a combined heat and power system having a controllable pump for adjusting operation of the heat exchanger and reduction system based on nitrogen oxide data, according to at least one example.

FIG. 2 illustrates a combined heat and power system 200 having a controllable pump for adjusting operation of the heat exchanger and reduction system based on nitrogen oxide data, according to at least one example. The combined heat and power system 200 includes a hydrogen engine 102, hydrogen supply 104, exhaust channel 106, heat exchanger 108, heat exchanger 110, first conduit 112, second conduit 114, bypass 116, bypass valve 118, catalytic converter 120, conduit 122, conduit 124, conduit 126, combined conduit 128, and conduit 130 as described with respect to FIG. 1.

In the combined heat and power system 200, a computing device 202 may be used to control one or more operations of the exhaust system. The computing device 202 may communicate with the hydrogen engine 102, heat exchanger 108, catalytic converter 120, and one or more sensors. For instance, the first conduit 112 and/or second conduit 114 may include a coolant pump 204 that may be in communication with the computing device 202. Additionally, the bypass valve 118 may be in communication with the computing device 202. The computing device 202 may control operation of the bypass valve 118 and/or coolant pump 204 to adjust a proportion of exhaust gases passing through the heat exchanger and/or a flow of a working fluid through the heat exchanger 108 and heat exchanger 110.

The combined heat and power system 200 includes a first sensor 206 and a second sensor 208 that may be used to measure one or more parameters of the exhaust gases such that the computing device 202 may control operation of the bypass valve 118 and/or the coolant pump 204. The first sensor 206 and the second sensor 208 may include nitrogen oxide sensors, designed and configured to detect components in the exhaust gases, preferably nitrogen oxides. In this manner, the combined heat and power system 200 may be controlled to adjust the concentration of nitrogen oxides within the exhaust gases through the catalytic converter 120.

The control of hydrogen gas injected into the catalytic converter 120 and/or the combined conduit 128 by the computing device 202 may be used to control the rate of reduction of the exhaust gases at the catalytic converter 120. In some examples, the first sensor 206 and/or the second sensor 208 may be used to measure nitrogen oxide within the exhaust gases. The proportion of the exhaust gases that is determined to include nitrogen oxide(s) may be used by the computing device 202 to determine the rate of hydrogen gas insertion into the catalytic converter 120. In some examples, a difference between the nitrogen oxide measured at the first sensor 206 and the second sensor 208 may be used to determine an amount of hydrogen gas to insert into the catalytic converter 120. In some examples, only one of the first sensor 206 and/or the second sensor 208 may be used to determine the nitrogen oxide concentration of the untreated exhaust gas. The hydrogen injection quantity can be controlled proportionally to the determined nitrogen oxide concentration and the exhaust gas mass flow.

In some examples, the first sensor 206 and/or the second sensor 208 may be designed, for example, as a nitrogen oxide sensor with an additionally integrated mixed potential electrode or sensor and can be based on an electrochemical principle. Therefore, the first sensor 206 and/or the second sensor 208 may detect the concentration of nitrogen oxides and the concentration of hydrogen in the exhaust gas, among the concentration of other gases within the exhaust gas.

In some examples, the amount of nitrogen oxide conversion within the catalytic converter 120, as measured based on a difference between the nitrogen oxide levels determined based on data from the first sensor 206 and the second sensor 208 may be used to control one or more operations of the combined heat and power system 200. In some examples, the combined heat and power system 200 may be controlled (e.g., by the computing device 202) to adjust one or more operating parameters based on nitrogen oxide(s) conversion rate at the catalytic converter 120. In some examples, the computing device 202 may control the bypass valve 118, coolant pump 204, and/or rate of hydrogen injection at or before the catalytic converter to increase a difference in nitrogen oxide detected at the second sensor 208 as compared with as detected at the first sensor 206.

In an illustrative example, the computing device 202 may adjust a rate of flow at the coolant pump 204 and/or an amount of exhaust gas that passes through the bypass valve 118 to adjust and/or control a temperature of the exhaust gases at the first sensor 206 and/or catalytic converter 120. By controlling the temperature and/or the amount of hydrogen inserted into the combined conduit 128, the computing device 202 may control the amount of nitrogen oxide conversion. Nitrogen oxide conversion may be controlled based on the reactants provided (e.g., amount of hydrogen) as well as the reaction temperature at the catalytic converter 120, as shown and described in FIG. 5. Therefore, by controlling the temperature at the catalytic converter 120, by the computing device 202 adjusting the coolant pump 204 and/or bypass valve 118, the proportion or amount of nitrogen oxide conversion (as measured at the first sensor 206 and the second sensor 208) may be controlled.

The first sensor data 214 and the second sensor data 216 may be used by the computing device 202 to determine the conversion rate of nitrogen oxide at the catalytic converter 120. The computing device 202 may therefore determine control signal 210 and/or control signal 212 to adjust the operating parameters of the coolant pump 204 and/or bypass valve to adjust (e.g., increase) the conversion rate of the nitrogen oxide. Additional control parameters, such as hydrogen injection rate, may also be determined and adjusted by the computing device.

Figure 3:
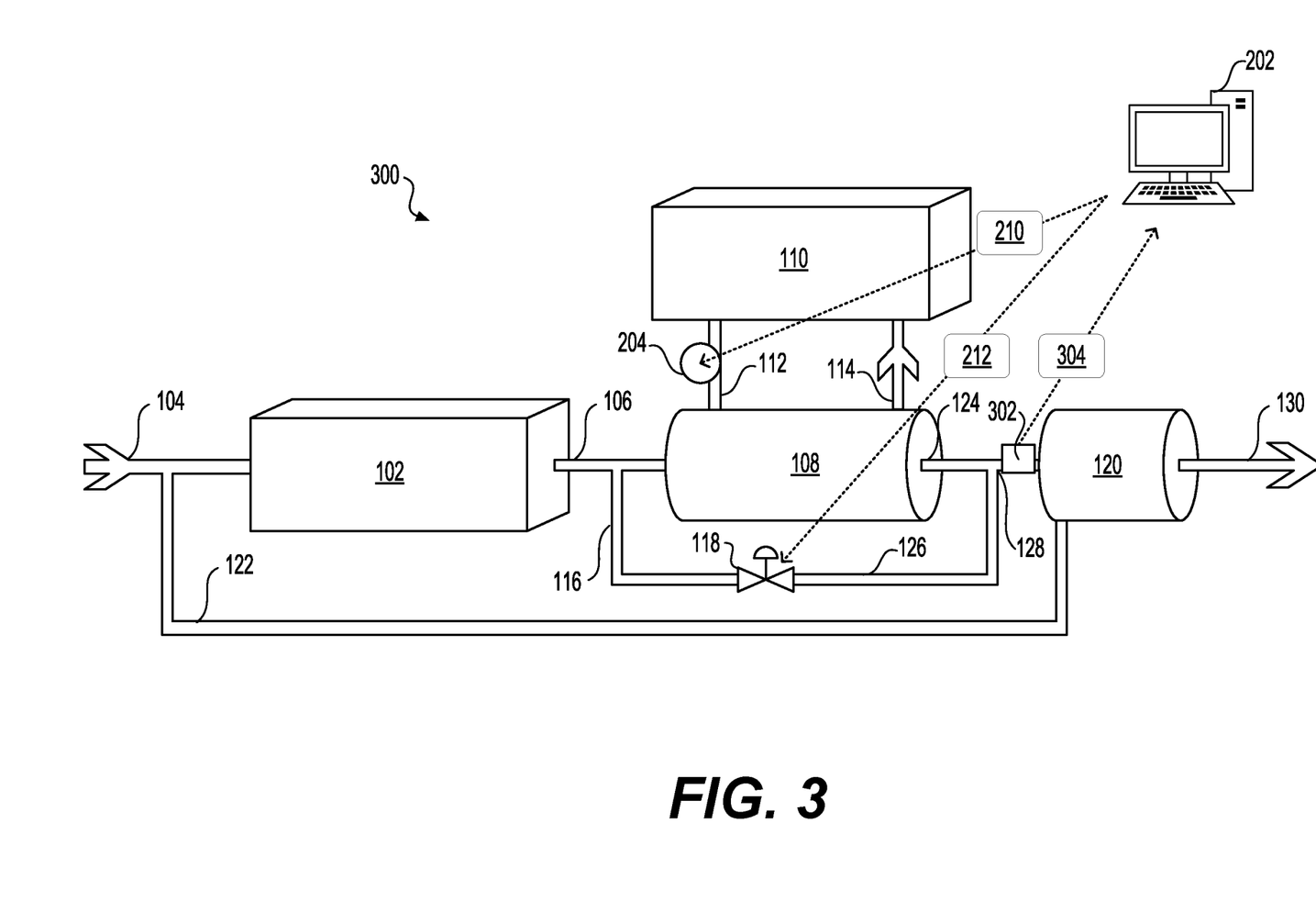
FIG. 3 illustrates a combined heat and power system having a controllable pump for adjusting operation of the heat exchanger and reduction system based on exhaust temperature, according to at least one example.

FIG. 3 illustrates a combined heat and power system 300 having a coolant pump 204 and bypass valve 118 for adjusting operation of the heat exchanger 108 and catalytic converter 120 based on exhaust temperature, according to at least one example. The combined heat and power system 300 includes a hydrogen engine 102, hydrogen supply 104, exhaust channel 106, heat exchanger 108, heat exchanger 110, first conduit 112, second conduit 114, bypass 116, bypass valve 118, catalytic converter 120, conduit 122, conduit 124, conduit 126, combined conduit 128, and conduit 130 as described with respect to FIG. 1 and/or FIG. 2 herein.

FIG. 3 further includes a temperature sensor 302 that is used to determine temperature data 304. The temperature data 304 may be determined at the combined conduit 128 and/or another location at or before the catalytic converter 120. The amount of nitrogen oxide conversion within the catalytic converter 120 may be based, at least in part, on a temperature of the exhaust gases at the catalytic converter 120. In some examples, the combined heat and power system 200 may be controlled (e.g., by the computing device 202) to adjust one or more operating parameters based on the temperature data 304 to maximize, or otherwise adjust the nitrogen oxide(s) conversion rate at the catalytic converter 120. In some examples, the computing device 202 may control the bypass valve 118, coolant pump 204, and/or rate of hydrogen injection at or before the catalytic converter to adjust a temperature of the exhaust gases at the catalytic converter 120.

In an illustrative example, the computing device 202 may adjust a rate of flow at the coolant pump 204 and/or an amount of exhaust gas that passes through the bypass valve 118 to adjust and/or control a temperature of the exhaust gases at the temperature sensor 302 and/or catalytic converter 120. By controlling the temperature at the combined conduit 128, the computing device 202 may control the amount of nitrogen oxide conversion. Nitrogen oxide conversion may be controlled based on the reactants provided (e.g., amount of hydrogen) as well as the reaction temperature at the catalytic converter 120, as shown and described in FIG. 5. Therefore, by controlling the temperature at the catalytic converter 120, by the computing device 202 adjusting the coolant pump 204 and/or bypass valve 118, the proportion or amount of nitrogen oxide conversion (as measured at the first sensor 206 and the second sensor 208) may be controlled.

The temperature data 304 may be used by the computing device 202 to determine the temperature at or before the catalytic converter 120. The computing device 202 may therefore determine control signal 210 and/or control signal 212 to adjust the operating parameters of the coolant pump 204 and/or bypass valve to adjust the temperature (and indirectly control the conversion rate of the nitrogen oxide). Additional control parameters, such as hydrogen injection rate, may also be determined and adjusted by the computing device 202.

Figure 4:
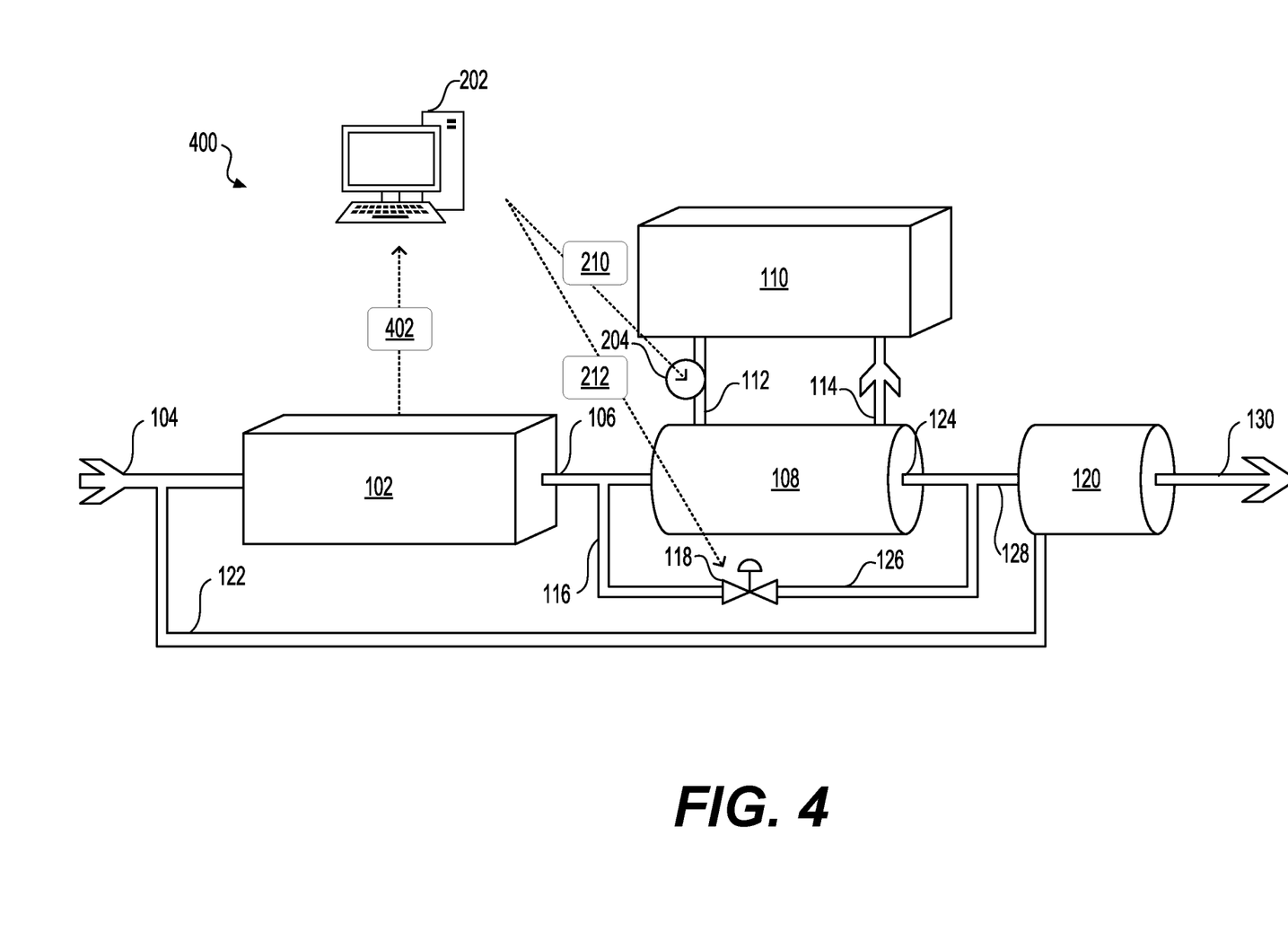
FIG. 4 illustrates a combined heat and power system having a controllable pump for adjusting operation of the heat exchanger and reduction system based on engine operating characteristics, according to at least one example.

FIG. 4 illustrates a combined heat and power system 400 having a coolant pump 204 and/or valve 118 for adjusting operation of the heat exchanger 108 and catalytic converter 120 based on engine operating characteristics, according to at least one example. The combined heat and power system 400 includes a hydrogen engine 102, hydrogen supply 104, exhaust channel 106, heat exchanger 108, heat exchanger 110, first conduit 112, second conduit 114, bypass 116, bypass valve 118, catalytic converter 120, conduit 122, conduit 124, conduit 126, combined conduit 128, and conduit 130 as described with respect to FIG. 1, FIG. 2, and/or FIG. 3 herein.

The computing device 202 may be used to control operation of the coolant pump 204 and/or the bypass valve 118 and therefore control conversion of nitrogen oxide gases and/or exhaust temperatures, as described herein. For instance, the computing device 202 may be used to control the control signal 210 and/or the control signal 212 and thereby adjust operation of the coolant pump 204 and/or the bypass valve 118 to adjust the temperature of the exhaust gases at the combined conduit 128. The temperature of the exhaust gases and/or other parameters of the exhaust gases at the catalytic converter 120 may be used to control the conversion of nitrogen oxides within the exhaust gases and/or to control other output parameters of the combined heat and power system 400 such as the temperature output by the heat exchanger 108 and/or heat exchanger 110.

In the example of FIG. 4, the combined heat and power system 400 may have the computing device 202 adjust the control signal 210, control signal 212, or other parameters of the system based on operating conditions of the hydrogen engine 102. The operating data 402 of the hydrogen engine 102, such as the firing rate, rotations per minute, rate of hydrogen consumption, rate of power production, or other such operating parameters may be used by the computing device 202 to determine the control signal 210, control signal 212, and/or other parameters of the system.

In a particular example, the operating data 402 may be used by a feed-forward control algorithm of the computing device 202 to determine the control signal 210, control signal 212, and/or other parameters based on past, present, or upcoming operating conditions of the hydrogen engine 102. In an example, the hydrogen engine 102 may ramp up operation, for instance to increase power production. The increase in operation may result, with a slight delay, in an increase in exhaust gas production volume and/or temperature at the exhaust channel 106. Accordingly, in response to the increase in operation of the hydrogen engine 102, the computing device 202 may increase the rate of flow at the coolant pump 204 and/or bypass valve 118 to adjust the temperature of the exhaust gases or other parameters at the catalytic converter 120 as described herein. The feed-forward control algorithm may be used to proactively respond and/or anticipate the changes in the output (e.g., exhaust gases) from the hydrogen engine 102. In some examples, the feed-forward control algorithm may include a machine learned algorithm trained using historical engine operating data and control signal data tagged with temperature and/or nitrogen oxide conversion rate data at the catalytic converter 120.

Figure 5:
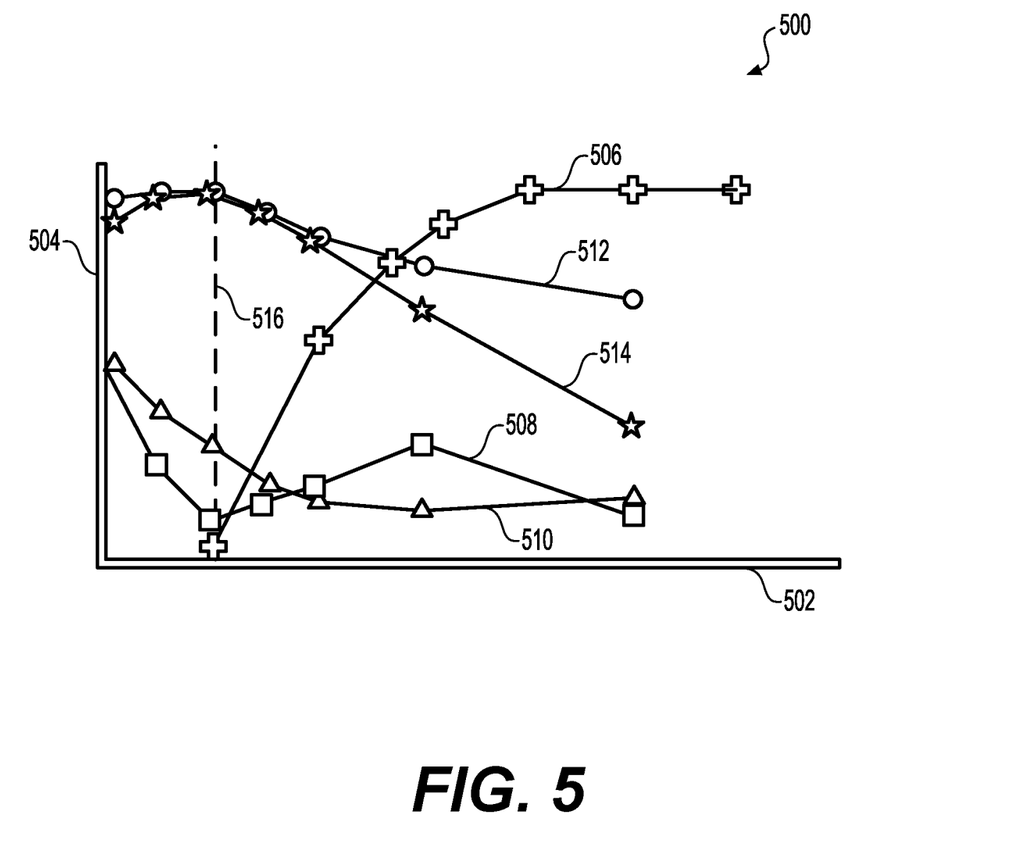
FIG. 5 illustrates an example chart of conversion of nitrogen oxides as a function of temperature, according to at least one example.

FIG. 5 illustrates an example chart 500 of conversion of nitrogen oxides as a function of temperature, according to at least one example. In the example chart 500, the independent (X) axis 502 illustrates temperature (e.g., temperature at the catalytic converter) while the dependent (Y) axis 504 illustrates the conversion rate and/or efficiency at the catalytic converter 120. In the example chart 500, a first data series 506 illustrates nitrogen oxide conversion when using urea as a reagent (shown as a %). In the example chart, a second data series 508 illustrates nitrogen oxide (N2O) selectivity at the catalytic converter using a mixed platinum and palladium catalyst. The nitrogen oxide selectivity and nitrogen oxide conversion may be controlled based on the precious metal loading within the catalytic converter (e.g., adjusting proportions or amounts of platinum, palladium, and/or other elements) and/or by adjusting the catalyst size within the catalytic converter 120. A third data series 510 shows nitrogen oxide (N2O) selectivity with a platinum catalyst. A fourth data series 512 illustrates nitrogen oxide conversion at the catalytic converter 120 (as a percentage) using a platinum catalyst. A fifth data series 514 illustrates nitrogen oxide conversion at the catalytic converter 120 using a mixture of platinum and palladium catalysts.

In general, and as illustrated in the example chart 500, conversion at the catalytic converter 120 when using hydrogen as a reagent is increasingly efficient (e.g., favors conversion or results in a higher conversion rate at relatively lower temperatures). In an example, the computing device 202 may control one or more of the parameters of the combined heat and power system described herein, such as described with respect to FIGS. 1-4, to adjust and/or control the nitrogen oxide conversion rate, such as to maximize the conversion rate. In an example, the peak conversion rate (e.g., at temperature 516) and/or efficiency of the catalytic converter 120 may be determined based on historical data and used to control the parameters of the combined heat and power system and thereby reduce nitrogen oxides present in the exhaust gases downstream of the catalytic converter 120. In some examples, the exhaust gases may be in a range of 120 to 150 degrees Celsius and the catalytic converter 120 may be controlled (e.g., by controlling exhaust temperatures or hydrogen injection) to a temperature range of ten degrees or less, twenty degrees or less, thirty degrees or less, or other such ranges.

INDUSTRIAL APPLICABILITY

The present description provides systems and methods for control of a combined head and power system that may be used for generation of power by a hydrogen internal combustion engine as well as heat production for the system by using the heat from the exhaust gases. Such systems and methods may be used to achieve better performance of combined heat and power systems and thereby reduce the need for separate heat and power systems in particular implementations. Additionally, such systems may provide for simplified operation and equipment by using hydrogen as a fuel for the engine as well as for reduction of exhaust gases within a catalytic converter. Accordingly, the combined heat and power system described herein may provide for improved performance and reduced exhaust outputs than a conventional system may include. Additionally, such systems and methods may be used to improve inefficiencies in machine operations. As noted herein, the machine operations may be improved by providing a simplified and improved performance of combined heat and power systems with reduced exhaust gases and contaminants than in conventional manifold design as well as having decreased passageway constrictions. In this manner, the combined heat and power system may be increasingly efficient over conventional systems with reduced environmental impact while meeting performance output requirements, thereby increasing worksite efficiency.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system comprising:
   a hydrogen supply;
   a hydrogen internal combustion engine that receives hydrogen from the hydrogen supply and generates power;
   a first exhaust conduit coupled to the hydrogen internal combustion engine for transporting first exhaust gases away from the hydrogen internal combustion engine;
   a heat exchanger coupled to the first exhaust conduit configured to receive the first exhaust gases from the hydrogen internal combustion engine and output second exhaust gases and heated fluid;
   a second exhaust conduit coupled to an outlet of the heat exchanger for transporting the second exhaust gases;
   a bypass conduit coupling the first exhaust conduit to the second exhaust conduit in parallel with the heat exchanger and comprising a bypass valve;
   a catalytic converter coupled to the second exhaust conduit downstream of the heat exchanger, the catalytic converter configured to receive hydrogen from the hydrogen supply and perform selective catalytic reduction on the second exhaust gases using the hydrogen;
   a first sensor positioned before an entrance to the catalytic converter configured to detect nitrogen oxides; and
   a second sensor positioned downstream of an exit from the catalytic converter and configured to detect nitrogen oxides, wherein the bypass valve is selectably controllable by a computing device based at least in part on data from the first sensor and the second sensor.

2. The system of claim 1, further comprising a temperature sensor positioned before an inlet to the catalytic converter, and wherein the bypass valve is controllable by a computing device based at least in part on temperature data from the temperature sensor.

3. The system of claim 1, further comprising a computing device configured to determine operating parameters of the hydrogen internal combustion engine and control the bypass valve based at least in part on the operating parameters.

4. The system of claim 1, further comprising:
   a coolant pump configured to control a flow of the heated fluid through the heat exchanger;
   wherein the coolant pump is controllable by a computing device based at least in part on data from the first sensor and the second sensor.

5. The system of claim 1, further comprising a temperature sensor positioned before an inlet to the catalytic converter, and wherein a coolant pump of the heat exchanger is controllable by a computing device based at least in part on temperature data from the temperature sensor.

6. The system of claim 1, further comprising a computing device configured to determine operating parameters of the hydrogen internal combustion engine and control a coolant pump of the heat exchanger based at least in part on the operating parameters.

7. An exhaust system for a hydrogen engine comprising:
a first exhaust conduit coupled to the hydrogen engine for transporting first exhaust gases away from the hydrogen engine;
a heat exchanger coupled to the first exhaust conduit configured to receive at least a portion of the first exhaust gases from the hydrogen engine and output second exhaust gases and heated fluid;
a second exhaust conduit coupled to an outlet of the heat exchanger for transporting the second exhaust gases;
a bypass valve that fluidly couples the first exhaust conduit and the second exhaust conduit separate from the heat exchanger;
a catalytic converter coupled to the second exhaust conduit downstream of the heat exchanger, the catalytic converter configured to receive hydrogen from a hydrogen supply of the hydrogen engine and perform selective catalytic reduction on the second exhaust gases using the hydrogen;
a first sensor positioned within the second exhaust conduit configured to measure a first concentration of nitrogen oxides;
a second sensor positioned downstream of an exit of the catalytic converter configured to measure a second concentration of nitrogen oxides;
a third sensor positioned within the second exhaust conduit configured to measure temperature; and
a computing device configured to input data from the first sensor, the second sensor, and the third sensor into a machine learned model trained using combined heat and power output data labeled with control parameters to control the bypass valve.

8. The exhaust system of claim 7, further comprising:
a coolant pump configured to control flow of coolant of the heat exchanger, and wherein the computing device is further
configured to control the coolant pump.

9. The exhaust system of claim 8, wherein the computing device is configured to determine control parameters for the coolant pump and the bypass valve by inputting the data from the first sensor, the second sensor, and the third sensor into the machine learned model.

10. The exhaust system of claim 8, wherein the computing device is configurable to control for at least one of (i) reducing nitrogen oxides emitted or (ii) increasing heat transfer by the heat exchanger.

11. The exhaust system of claim 10, wherein the computing device is configured to control for heat transfer by the heat exchanger, and the computing device is configured to apply a weighting factor to control the coolant pump.

12. The exhaust system of claim 9, further comprising:
a coolant pump configured to control flow of coolant of the heat exchanger;
wherein the computing device is configured to determine engine output data describing one or more outputs of the hydrogen engine, and wherein the computing device is configured to control the bypass valve or the coolant pump based at least in part on the engine output data.

13. The exhaust system of claim 12, wherein the computing device is configured to determine control parameters for at least one of the bypass valve or the coolant pump by using a machine learned model trained using engine output data annotated using previous control parameters and exhaust output data describing outputs from at least one of the heat exchanger or the catalytic converter.

14. The exhaust system of claim 12, wherein the computing device is configured to determine control parameters for at least one of the bypass valve or the coolant pump by using a feed forward control algorithm based on the engine output data.

15. A combined heat and power system comprising:
a first hydrogen supply line;
a hydrogen internal combustion engine that receives hydrogen from the first hydrogen supply line and produces power;
a first exhaust conduit extending from the hydrogen internal combustion engine;
a heat exchanger coupled with the first exhaust conduit that transfers heat from exhaust gases emitted by the hydrogen internal combustion engine;
a coolant pump that controls a flow of coolant through the heat exchanger;
a second exhaust conduit extending from the heat exchanger;
a first sensor positioned within the second exhaust conduit and configured to measure a first concentration of nitrogen oxides;
a bypass valve fluidly coupling the first exhaust conduit to the second exhaust conduit in parallel with the heat exchanger;
a second hydrogen supply line;
a catalytic converter coupled to the second exhaust conduit downstream of the heat exchanger, the catalytic converter configured to receive hydrogen from the second hydrogen supply line and perform selective catalytic reduction on exhaust gases using the hydrogen;
a second sensor positioned downstream of an exit of the catalytic converter and configured to measure a second concentration of nitrogen oxides;
a third sensor positioned within the second conduit and configured to measure temperature; and
a computing device configured to input data from the first sensor, the second sensor, and the third sensor into a machine learned model trained using combined heat and power output data labeled with control parameters to control the bypass valve and the coolant pump.

* * * * *